US008151630B1

(12) United States Patent
Gardner et al.

(10) Patent No.: US 8,151,630 B1

(45) Date of Patent: Apr. 10, 2012

(54) QUANTITATIVE FIT TEST SYSTEM AND METHOD FOR ASSESSING RESPIRATOR BIOLOGICAL FIT FACTORS

(75) Inventors: Paul D. Gardner, Bel Air, MD (US); Jonathan P. Eshbaugh, Baltimore, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 217 days.

(21) Appl. No.: 12/613,982

(22) Filed: Nov. 6, 2009

Related U.S. Application Data

(62) Division of application No. 11/613,577, filed on Dec. 20, 2006, now Pat. No. 7,614,280.

(60) Provisional application No. 60/779,505, filed on Mar. 6, 2006.

(51) Int. Cl.
*G01M 3/00* (2006.01)
*G01M 1/22* (2006.01)

(52) U.S. Cl. .......... 73/40; 73/38; 73/863.21; 73/863.41; 73/863.71

(58) Field of Classification Search ................ 73/38, 40, 73/40.7, 46, 52, 863.21, 863.41, 863.71
See application file for complete search history.

(56) References Cited

U.S. PATENT DOCUMENTS 2,738,669 A * 3/1956 Silverman et al. ................ 73/40
4,132,894 A * 1/1979 Yule .............................. 250/435
4,146,025 A * 3/1979 Warncke et al. ......... 128/201.23
H185 H * 1/1987 McMahon .................... 351/226
4,670,135 A * 6/1987 Marple et al. ................. 209/143
4,767,524 A * 8/1988 Yeh et al. ...................... 209/143
4,846,166 A * 7/1989 Willeke .................... 128/200.24
4,914,957 A * 4/1990 Dougherty ........................ 73/40
H799 H * 7/1990 Farthing et al. ................. 55/392
5,059,348 A * 10/1991 Guelta et al. ............... 252/408.1
5,059,349 A * 10/1991 Carlon et al. .............. 252/408.1
5,059,350 A * 10/1991 Carlon et al. .............. 252/408.1
5,059,351 A * 10/1991 Carlon et al. .............. 252/408.1
(Continued)

FOREIGN PATENT DOCUMENTS

RU 2199359 C2 * 2/2003
(Continued)

OTHER PUBLICATIONS

Paul Gardner, "Method for Measuring Protection Factors with a Submicron Corn Oil Aerosol", Dec. 2006.*
(Continued)

*Primary Examiner* — David Rogers
(74) *Attorney, Agent, or Firm* — Ulysses John Biffoni

(57) ABSTRACT

A quantitative fit test (QNFT) system and method for assessing the biological fit factor (FF) performance of respiratory protective devices. The biological QNFT system includes the following three main elements: an aerosol generation system; an exposure chamber; and an aerosol sampling subsystem. The aerosol sampling subsystem includes an aerosol spectrometer that counts particles in discrete size units ranging from 0.5 to 20 micrometers (μm) making it possible to obtain several size-specific FF measurements from a single respirator fit test. A virtual impactor in the aerosol generation system increases the number of challenge particles in the primary target size of interest (1 to 5 μm) and increases the sensitivity of the method allowing FF values of up to one million to be measured without the need to correct for in-mask background particles.

6 Claims, 7 Drawing Sheets

U.S. PATENT DOCUMENTS

| | | | | | |
|---|---|---|---|---|---|
| 5,059,352 | A | * | 10/1991 | Carlon et al. | 252/408.1 |
| 5,059,353 | A | * | 10/1991 | Carlon et al. | 252/408.1 |
| 5,076,965 | A | * | 12/1991 | Guelta et al. | 252/408.1 |
| 5,080,829 | A | * | 1/1992 | Carlon et al. | 252/408.1 |
| 5,087,389 | A | * | 2/1992 | Carlon et al. | 252/408.1 |
| 5,094,779 | A | * | 3/1992 | Carlon et al. | 252/408.1 |
| 5,096,615 | A | * | 3/1992 | Prescott et al. | 516/1 |
| H1040 | H | * | 4/1992 | Carlon et al. | 252/408.1 |
| 5,133,344 | A | * | 7/1992 | Jurrius et al. | 128/201.23 |
| 5,205,624 | A | * | 4/1993 | Martell et al. | 312/1 |
| 5,318,018 | A | * | 6/1994 | Puma et al. | 128/202.11 |
| 5,320,108 | A | * | 6/1994 | Cloutier | 600/529 |
| 5,323,774 | A | * | 6/1994 | Fehlauer | 128/206.12 |
| 5,500,027 | A | * | 3/1996 | Rudolph et al. | 96/257 |
| 5,788,741 | A | * | 8/1998 | Burton et al. | 95/32 |
| 5,918,254 | A | * | 6/1999 | Bottiger et al. | 73/1.06 |
| 6,125,845 | A | * | 10/2000 | Halvorsen et al. | 128/200.24 |
| 6,183,950 | B1 | * | 2/2001 | Madonna et al. | 435/5 |
| 6,402,817 | B1 | * | 6/2002 | Bergman | 95/267 |
| 6,752,146 | B1 | * | 6/2004 | Altshuler et al. | 128/201.25 |
| 6,797,943 | B2 | * | 9/2004 | Losch et al. | 250/282 |
| 6,955,170 | B1 | * | 10/2005 | Mullins et al. | 128/200.24 |
| 7,044,126 | B2 | * | 5/2006 | Gavriely | 128/201.25 |
| 7,325,465 | B2 | * | 2/2008 | Solomon et al. | 73/863.22 |
| 2002/0124664 | A1 | * | 9/2002 | Call et al. | 73/863.22 |
| 2002/0179499 | A1 | * | 12/2002 | Kenning et al. | 209/143 |
| 2003/0200966 | A1 | * | 10/2003 | Frund, Jr. | 128/201.29 |
| 2004/0011363 | A1 | * | 1/2004 | Wiener et al. | 128/206.17 |
| 2005/0223778 | A1 | * | 10/2005 | Tilley | 73/40 |

FOREIGN PATENT DOCUMENTS

| | | | | |
|---|---|---|---|---|
| SU | 1736520 | A1 | * | 5/1992 |
| WO | WO 9824516 | A1 | * | 6/1998 |
| WO | WO 2007040634 | A2 | * | 4/2007 |
| WO | WO 2007116424 | A1 | * | 10/2007 |

OTHER PUBLICATIONS

TSI Application Note ITI-070: Introduction to Respirator Fit Testing, TSI Incorporated, 2006.*

Portacount Pro 8030 & Portacount Pro 8038 Respirator Fir Testors, TSI Incorporated, Jun. 2008.*

Model 8587A Laser Photometer Operation and Service Manual, TSI Incorporated, Apr. 2008.*

* cited by examiner

QUANTITATIVE FIT TEST SYSTEM AND METHOD FOR ASSESSING RESPIRATOR BIOLOGICAL FIT FACTORS

RELATED APPLICATION

This Application is a divisional of application Ser. No. 11/613,577, filed on Dec. 20, 2006, now U.S. Pat. No. 7,614, 280.

This application claims the benefit of priority from U.S. provisional application Ser. No. 60/779,505 filed Mar. 6, 2006, the entirety of which is hereby incorporated by reference.

BACKGROUND OF THE INVENTION

1. Field of the Invention

The field of the invention is related to quantitative fit tests (QNFT) used to grade respiratory protective devices. More particularly, the invention is related to a novel and non-obvious quantitative fit test for protective respiratory devices that would be used in the case of chemical, biological, radiological and nuclear (CBRN) hazards.

2. Description of the Related Art

Respiratory protection devices used for military and homeland defense applications must protect against a wide range of chemical, biological, radiological and nuclear (CBRN) hazards. The effectiveness of a CBRN respirator system to protect the wearer against airborne hazards relies on both the performance of the respirator filtration system and the respirator-wearer seal. A properly fitted and sealed respirator will form a tight impenetrable bond at the respirator and wearer interface, while an improperly sealed respirator will allow hazardous materials to circumvent the filtration system and enter the respirator. The effectiveness of a respirator to seal off the contaminated area to the wearer and protect against airborne hazards is quantified in terms of a fit factor (FF). The FF, which is a quantitative estimate of a respirator fit, is defined as the ratio of the challenge concentration outside the respirator to the concentration measured inside the respirator facepiece.

The quantitative fit test (QNFT) provides one with what many consider to be the most accurate, convenient, and non-subjective form of testing. The test results are immediate, unambiguous, and take no more time to perform than qualitative testing methods.

Occupational Safety and Health Act (OSHA) regulations require that all employees using respirators be fit tested either annually or semi-annually, based on the hazard to which they are exposed. All qualitative fit tests are conducted in accordance with 29 C.F.R. §1910.134. The standard photometer-based QNFT method used by the U.S. military and the National Institute for Occupational Safety and Health (NIOSH) to qualify the protection level of CBRN respirators can not sufficiently quantify the FF required for biological agents. The current QNFT method uses a polydisperse corn oil aerosol challenge with a mass median aerodynamic diameter (MMAD) of 0.4 to 0.6 micrometers (μm) that is intended to represent both gas/vapor and aerosol chemical threat agents with respect to respirator (mask) seal leakage. An aerosol photometer is used to measure the relative concentration of the challenge and respirator in-mask atmosphere, which is determined by light scattering of the particles in the sample stream. The higher the fit factor, the better the mask guards against leakage. It is known that factors up to 100,000 can be measured using this method of testing.

FIG. 8 shows one popular testing method using an exposure chamber 100 to confine the generated corn oil challenge around the person 110 being fit tested. After donning the respirator 120 and entering the exposure chamber 100, the person 110 performs a series of exercises designed to stress the face seal of the respirator to determine whether the face seal performs satisfactorily under actual use in a potentially contaminated area. The respirator 120 must be equipped with High Efficiency Particulate Air (HEPA) filters (HEPA filters having been tested to assure removal of 99.97% of particles 0.3 μm in size) that prevent the aerosol challenge from penetrating. Thus, when a fit test is performed, it is assumed that all particles sampled from inside the respirator have entered through a face seal leak.

A popular device for conducting a QNFT test in the industry is known as a PORTACOUNT® (available from TSI, St. Paul, Minn.). The U.S. military will sometimes fit test respirators for use in the workplace with the PORTACOUNT because of its ease of use and simplicity. The PORTACOUNT® is a portable particle-counting instrument that uses condensation particle counting technology to measure the number concentration of particles both outside and inside the respirator to determine the FF number. The instrument utilizes particles found in the ambient air (the majority of particles typically occur in the 0.01 to 0.1 μm range) as the test challenge. This instrument also eliminates the need for aerosol generators and test chambers. The PORTACOUNT® is capable of measuring FF values of up to 10,000 or higher depending on the ambient particle background concentration.

Although the above QNFT methods may effectively qualify the protection afforded against toxic chemical gas/vapor and particulate hazards, these methods do not provide an effective measurement of protection against biological agents. Biological weapons pose a unique threat to military and civilian populations since they are usually invisible, odorless, exhibit latent effects, and are not easily detectable compared to conventional chemical warfare agents. Infectious biological agents such as anthrax, small pox, and tularemia are of particular concern since inhalation of a relatively small number of organisms can result in a lethal dose. Furthermore, biological aerosols (bio-aerosols) are more likely to be present on ambient particulate matter or exist as conglomerates (i.e., particles consisting of multiple organisms) that range from 1 to 5 μm in diameter.

Neither the photometer nor the PORTACOUNT® QNFT devices have the ability to determine the size of the particulate challenge. Furthermore, corn oil and ambient aerosol QNFT challenges as currently used in these methods are not good simulants of biological agents. Both test challenges exist as polydisperse aerosols consisting of mostly smaller particles and relatively few particles similar in size to the vast majority of bio-aerosol threat agents (i.e., >1 μm). Thus, the respirator is challenged with a low concentration of particles comparable in size to biological agents. As previously mentioned, the photometer-based QNFT method provides a FF that is based on the relative concentration of particles penetrating the respirator seal. The FF is determined directly from the voltage reading from the light-scattering photometer aerosol sensor and is therefore not an absolute measurement of concentration. The photometer can be calibrated to yield a total mass concentration measurement (e.g., mg/m$^3$), but this is not typically done for quantitative fit testing applications. Toxicological effects of chemical agents are a function of the mass concentration (effective dose). For biological agents, however, it is the number of viable organisms inhaled and not the mass concentration that determines the risk of a life-threatening exposure. With no size-specific count measurement capability, the true number of simulated biological particles penetrating the seal cannot be determined using the conventional photometer or particle-counting QNFT methods.

Another shortcoming of conventional QNFT methods is that they lack sufficient sensitivity to measure FF values required for highly lethal biological agents. A relatively small number of these hazardous organisms can cause severe health effects when inhaled. Hence, the level of respiratory protection required for biological agents is in general at least an order of magnitude higher than that needed for chemical agents. Furthermore, background particles generated by the mask wearer during fit testing (typically from exhaled breath) can result in artificially low FF values when particle-counting QNFT instruments are used. In order to measure the FF required for biological protection and overcome measurement bias caused by background particles, the challenge concentrations of simulated biological particles needs to be several orders of magnitude higher than is obtainable using conventional QNFT methods.

Therefore, there is a need in the art to provide a system and method of QNFT testing that provides a way to create a challenge atmosphere of particles that are comparable in size to bio-hazardous agents, and a way to count these particles according to size to fit test the mask and/or respirator system and determine its effectiveness against bio-hazardous agents.

SUMMARY OF THE INVENTION

The invention provides a system for and a method of fit testing that permits biological fit factors to be measured quantitatively. The inventors refer to this inventive system as a bio-QNFT system comprised of three main elements, an aerosol generation device, an exposure chamber, and aerosol sampling subsystems. It is possible that the aerosol generation device can be a known aerosol generator, but it is preferred that the aerosol generation device described herein be used to increase the accuracy of results of the testing.

In addition, the present invention allows the use of a predetermined size of challenge particles in the challenge atmosphere that correspond to bio-hazardous agents so that the fit test provides accurate results for typical biological agents. A novel and nonobvious type of impactor, which is referred to herein as a virtual impactor, is preferably provided to allow the separation of challenge particles of a desired size that can be used in the challenge atmosphere with a nebulizer much more accurately and inexpensively than known heretofore.

BRIEF DESCRIPTION OF THE DRAWINGS

For purposes of illustration and not intended to limit the scope of the invention in any way, the aforementioned and other characteristics of the invention will be clear from the following description of a preferred form of the embodiments, given as non-restrictive examples, with reference to the attached drawings wherein.

The bio-QNFT system is comprised of the following three main elements: the aerosol generation, exposure chamber, and aerosol sampling subsystems.

DETAILED DESCRIPTION OF THE INVENTION

While a detailed description of the invention follows in conjunction with the above-identified drawings, it is to be understood that the examples are for illustrative purposes and, for example, when a drawing (or photo) shows more than a multiple quantity of any element, the claimed invention does not require the multiple quantity of any such element unless it is specifically stated that a plurality of an element is required. In addition, the description includes dimensions for illustrative purposes as well as a preferred embodiment, but it is understood that the appended claims are in no way limited by the specified size of any of the elements discussed in the written description.

Figure 1:
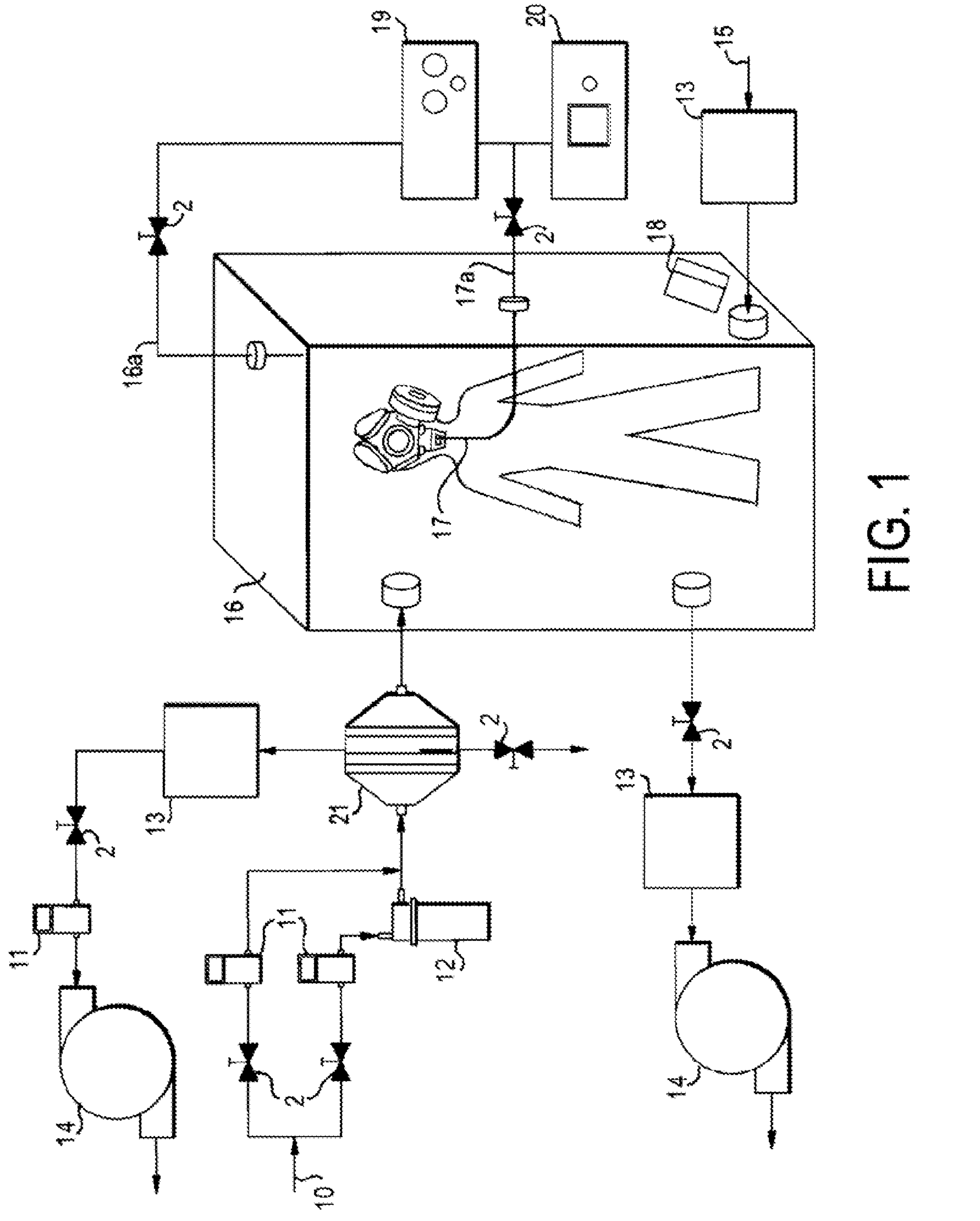
FIG. 1 is a schematic view of the process showing the key components of each subsystem.

Referring first to FIG. 1, the complete bio-QNFT system schematic is displayed. The entire bio-QNFT system typically comprises a compressed air source 10, mass flow meters 11, an aerosol nebulizer 12, HEPA filters 13, exhaust blowers 14, ambient room air 15, an exposure chamber 16, a respirator sample probe 17, a mixing fan 18, a diluter 19, an aerosol spectrometer 20, and a virtual impactor 21. The flow lines may have valves 2 as desired.

Still referring to FIG. 1, the exposure chamber 16 is designed to hold the challenge atmosphere while allowing the mask wearer to perform the appropriate exercise activities. Concentrated challenge aerosol, which is typically made by providing compressed air from compressed air source 10 to nebulizer 12, with the nebulizer being filled with an oil of an inert substance that is aerosolized (discussed further below) and enters the chamber 16 from the aerosol generator effluent and mixes with ambient air 15 that enters through a large particulate filter 13 located on the side of the chamber (dilution air source). A mixing fan 18 within the chamber 16 is used to ensure a well-mixed atmosphere (i.e., test challenge atmosphere) is created. The exhaust blower unit 14 continuously removes challenge aerosol, thereby creating a constant inward flow of dilution air. The continual mixing of dilution and new challenge air within the chamber maintains a steady challenge atmosphere.

The exposure chamber 16 illustrated in FIG. 1 is approximately 1 meter (m) in length, 1 m in width, and 2 m in height. Preferably there would be included a separate attached enclosure (not shown), i.e., an “air-lock” entrance, to prevent the test challenge from escaping when the person enters and exits the chamber. The size of the chamber can be increased or decreased to accommodate more than one person, different exercise routines, and associated exercise equipment, but an artisan appreciates that a change in chamber size will affect the amount of time the chamber requires to fill with aerosol. A mixing fan 18 is used to create a uniform test challenge. The mixing fan 18 shown is approximately 20 centimeters (cm) in diameter and is set on low to gently mix the challenge atmosphere. Other fan sizes can be used, but the fan should be sized appropriately and run on a low speed setting to avoid excessive loss of the challenge caused by deposition of the particles on the fan blades.

The exhaust blower unit 14 includes an electric motor used to blow exhaust away from the chamber 16 via a large HEPA filter 13 connected to the exposure chamber 16 with flexible conduit (not shown). The exhaust blower 14 steadily removes and filters the challenge atmosphere with a HEPA filter 13 before exhausting the particle-free air back into the room. The exhaust blower 14 used in the prototype version of the present invention was a commercial shop vacuum (Model SG4000, Ridgid Tool Company) controlled with a variable autotransformer (not shown). The autotransformer used (Model 3PN1010B, Staco Energy Products) allows for the flow of the exhaust to be controlled. An adjustment to the exhaust flow will result in a change in dilution air and thus create a corresponding change in challenge concentration. It is to be noted that if the shop vacuum 14 contains an integrated HEPA-quality filter, it may not be necessary to include the separate HEPA filter 13 as illustrated in FIG. 1. Any HEPA filter system having a blower and a variable speed controller capable of exhausting between 100 and 500 liters (L)/min can be used to provide adequate control of the chamber aerosol concentration. Likewise, any autotransformer compatible with the voltage range of the blower unit 14 can be substituted in the present invention. The amount of exhaust airflow required will depend on the size of the QNFT enclosure (chamber) and the challenge concentration generated.

The aerosol sampling subsystem (19, 20, and its associated tubes 16*a*, 17*a*) is designed to measure the number, concentration, and particle size of the respirator and exposure chamber 16 atmospheres. A flexible plastic sample tube 16*a* that leads from the exposure chamber 16 to the diluter 19 is used to sample the challenge atmosphere. A separate flexible plastic sample tube 17*a* is connected to the respirator probe 17 to sample the in-mask challenge concentration. To minimize particle transport loss, the sample tubes should be kept the same length and as short as possible. The respirator sample tube 17*a* should be of sufficient length to permit unrestricted movement of the mask wearer while performing the fit test exercises.

The aerosol spectrometer 20 used in this embodiment of the present invention is an Aerodynamic Particle Sizer (APS, Model 3321, TSI Inc.). The APS is a general-purpose particle counting spectrometer that measures the acceleration of particles within an accelerated aerosol stream to determine the particle aerodynamic diameter. The APS counts the particles and sorts them in 1 of 32 bins (channels) ranging from 0.5 to 20 μm. Any comparable particle counting/sizing spectrometer with the ability to measure from 0.5 to 10 μm can be substituted. The diluter 19 used was a capillary diluter (Model 3302A, TSI Inc.) adjusted to a dilution factor of 100. Other dilutors and dilution rates compatible with the aerosol sampling subsystem can be used. To minimize particle transport losses, TYGON® tubing is preferably used for the sample lines, but other flexible tubing with like properties can be used. The higher the concentration and sample rate, the shorter the sampling time required. In-mask sampling rates above 2 L/min are not recommended since they can lead to false leakage due to a potential for increased negative pressure within the respirator facepiece. A sample rate of 1 L/min is used in the present invention for both challenge and in-mask sampling. At this flow rate, the preferred sample duration is one minute. A higher challenge sample flow rate can be used if needed to increase measurement accuracy. The challenge atmosphere is typically measured at the beginning and end of the fit test and averaged to calculate the FF values. Longer chamber and in-mask sample times can be used to increase measurement sensitivity if particle challenge concentrations are unstable or lower than optimal. To complete the fit test in a timely manner, however, it is important to keep sample times to a minimum.

One of the advantageous features of the bio-QNFT system is the aerosol generation subsystem. The aerosol generation subsystem is designed to produce high concentrations of inert challenge particles in the size range of interest for simulating airborne biological agents (i.e., about 1 to 5 μm). The subsystem includes three major parts: a nebulizer 12, a virtual impactor 21, and an exhaust pump 14. The nebulizer 12 aerosolizes oil using pressurized air to create a high polydisperse aerosol concentration. The polydisperse aerosol mixes with dilution air before entering the virtual impactor 21. The addition of dilution air from compressed air 10 allows the operator to keep the total flow (aerosol plus dilution) constant while providing the ability to adjust the challenge concentration entering the virtual impactor 21. This constant total flow is important because the virtual impactor 21 is designed for a specific airflow rate and will work properly only with the designed airflow. The diluted polydisperse aerosol flows into the virtual impactor 21 where it is separated into two streams. An exhaust blower 14 controls the flow of the major stream, which is made up of smaller diameter particles (<1.0 μm). The major stream is exhausted into the room after flowing through a HEPA filter 13. Since the virtual impactor is sealed, the remaining minor flow with the larger particles (>1.0 μm) is forced into the exposure chamber 16 without flowing through a blower or any other disruptive device.

The present invention uses a 24-jet Collison nebulizer to aerosolize corn oil as the test challenge. Other aerosol generators capable of aerosolizing a polydisperse oil aerosol with a large quantity of large particles (>1.0 μm) can be used. Corn oil is used in the present invention since it is a widely accepted non-toxic inert oil; however, other non-toxic oil substitutes such as a polyalphaolefin (e.g., DURASYN 164®) can be used if desired.

In operation, the virtual impactor 21 is distinguishable from a known (i.e. conventional) impactor at least because the virtual impactor uses major and minor air streams in the separation of the particles. The larger particles are separated into a slower moving minor air stream instead of being impacted on a solid surface (i.e., a plate). Thus, the larger particles (>1.0 μm) are separated and concentrated into a minor air stream to provide the test challenge stream. The major stream contains the relatively smaller size particles and is discarded.

Figure 2A:
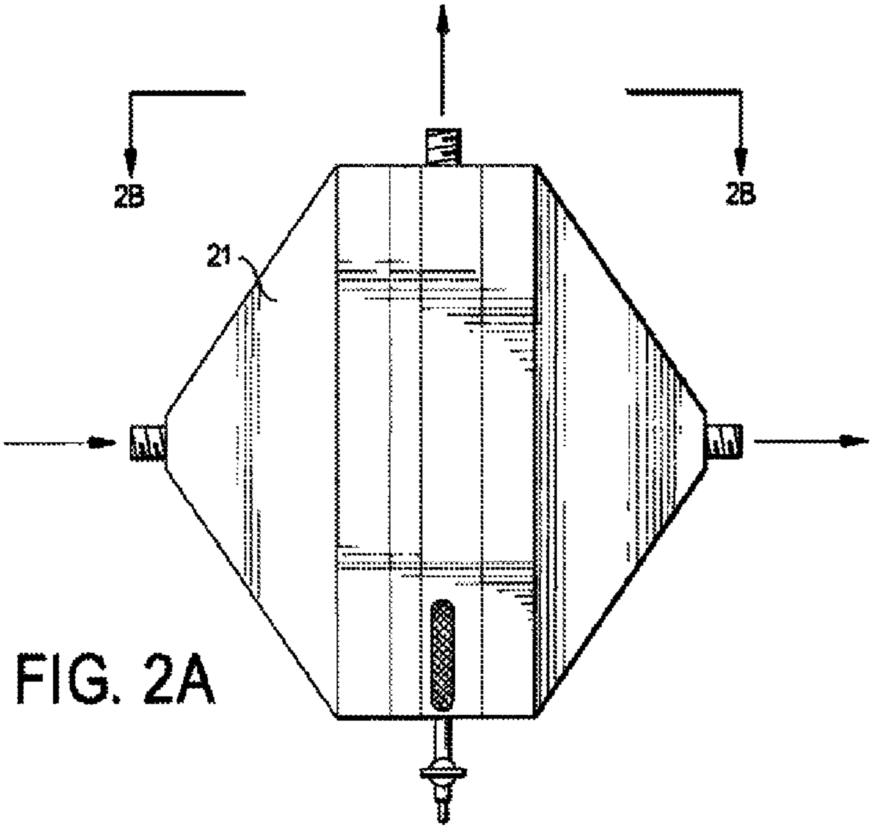
FIGS. 2A and 2B provide a side and a cutaway view of the virtual impactor used in the aerosol generation subsystem.
Figure 2B:
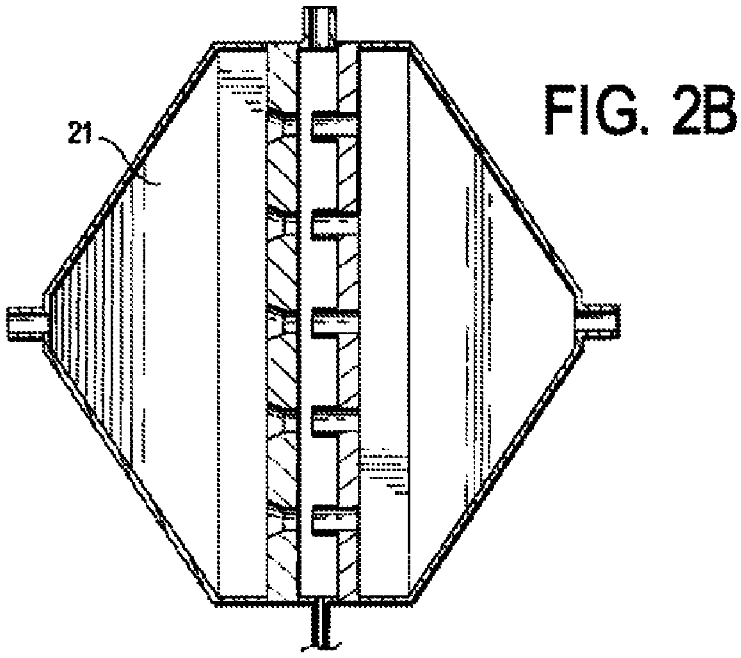
Figure 3:
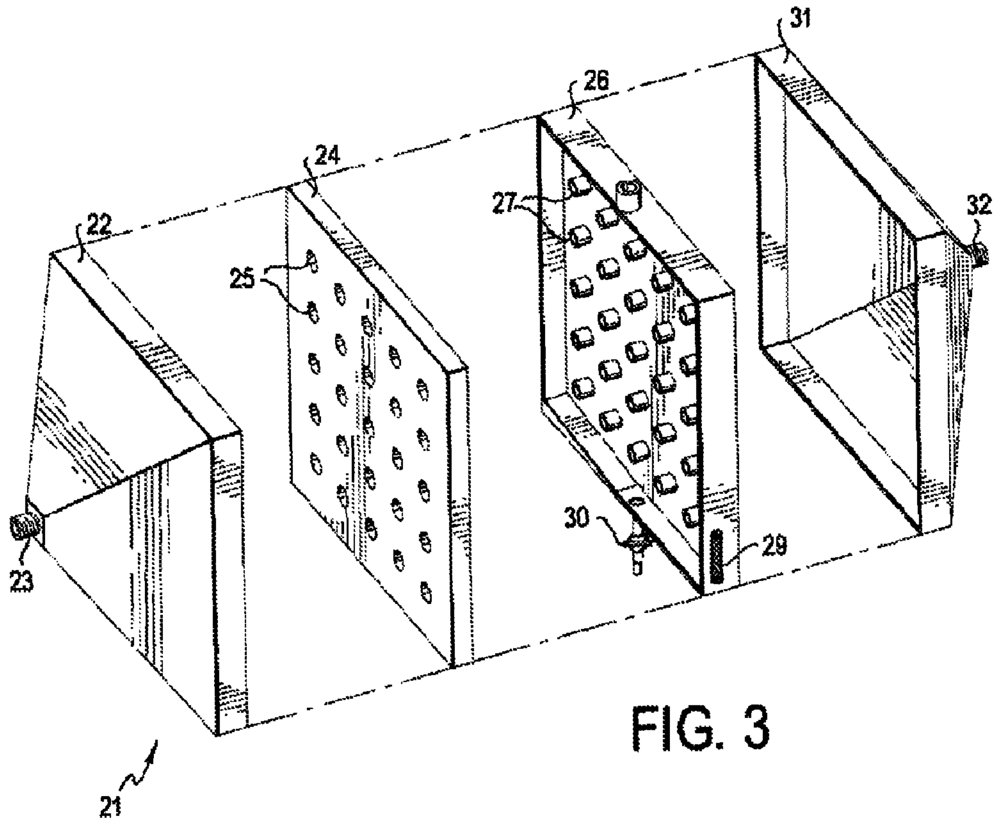
FIG. 3 is an exploded view of the virtual impactor assembly and its associated components.

A round multi-nozzle virtual impactor 21 design is illustrated in FIG. 2A, FIG. 2B and FIG. 3. The impactor 21 is designed for a total polydisperse flow between 100 and 200 L/min and is approximately 15 cm in height, 15 cm in width, and 15 cm in length. While the dimensions are preferably equal, the impactor 21 can be built in virtually any polygonal shape, and the sides can be much longer or shorter than 15 cm according to need (for example 15 cm×25 cm×20 cm).

Referring now to FIG. 3, the impactor 21 includes four main components that fit together. The first component, the influent housing 22, connects the impactor 21 to the polydisperse aerosol through a circular connection 23.

Still referring to FIG. 3, the first component 22 is designed to spread out the aerosol before it flows into the second component 24.

Continuing to refer to FIG. 3, the second component, or nozzle plate 24, contains the nozzles 25 that accelerate the aerosol. In the shown embodiment of the present invention, there are 25 cone shaped nozzles 25 in the nozzle plate 24. The aerosol enters on the large side of the nozzle 25 and accelerates as the nozzle diameter decreases. The nozzle diameter of the outlet (i.e., the small side) is between 1 and 2 millimeters (mm).

As also shown in FIG. 3, the third component 26, which is the most complex component in the virtual impactor 21, is also referred to as the collection plate 26. The collection plate 26 contains 25 collection nozzles 27 that collect the larger aerosol particles. The collection nozzles 27 are paired exactly with the acceleration nozzles 25. The distance between the outlet of the acceleration nozzles 25 and the inlet of the collection nozzles 27 is approximately 1.5 times the diameter of the acceleration nozzle 25 outlet. The space between the two nozzles 25, 27 allows the blower 14, which connects to the virtual impactor 21 through a circular connection 28 in the collection plate 26, to exhaust a majority of the airflow. As the air exits the acceleration nozzles 25, a majority of the aerosol-laden air stream turns before entering the collection nozzles 27. Only smaller particles can overcome the inertial forces and make the sharp turn. The larger particles and a minority of the airflow continue into the collection nozzles 27. The collection nozzle 27 diameter is approximately 1.5 times the outlet diameter of the acceleration nozzle. Although the virtual impactor 21 is designed to minimize particle loss, oil will eventually build up within the impactor after extended use. Thus a window 29 within the collection plate 26 is used to monitor the oil buildup level. The virtual impactor 21 is also equipped with a waste removal valve 30 used to remove the oil buildup.

Finally, while still referring to FIG. 3, the fourth component, the effluent housing 31, in the virtual impactor 21 collects the minor aerosol flow and directs it to the exposure chamber through a circular connection 32 that attaches to flexible tubing (not shown).

The virtual impactor 21 is an important part of the present invention. Without the impactor, the large concentration of polydisperse aerosol, consisting mostly of unwanted sizes (i.e., <1.0 μm), would flood the aerosol measurement instrument (i.e., spectrometer). The use of a second diluter 19 operated in series with the aerosol spectrometer 20 to reduce the total challenge concentration (e.g., 1000 to 1 dilution ratio) is not a practical solution since such high dilution ratios are very difficult to achieve without biasing the particle counting measurements. The degree of sampling bias would vary significantly with particle size and thus result in highly variable, inaccurate FF results.

Figure 4:
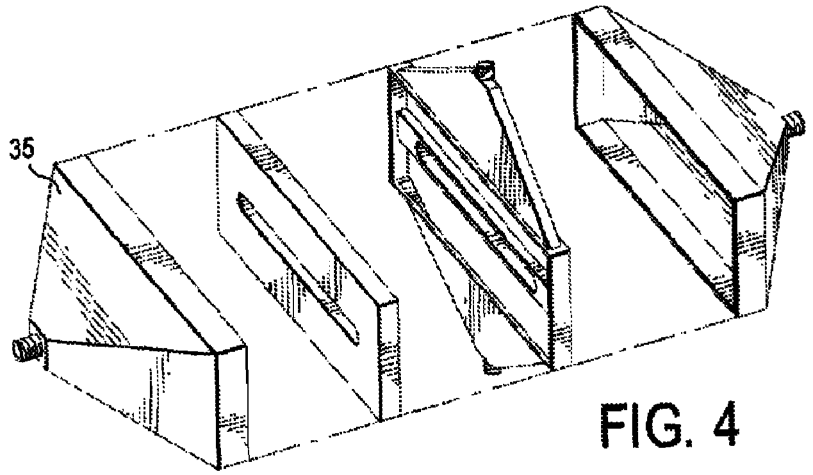
FIG. 4 is an exploded view of an alternative design of a virtual impactor.

The virtual impactor 21 described in FIGS. 2 and 3 is a simple round multi-nozzle design. Other virtual impactors, such as rectangular or slit nozzle virtual impactor, that provide the appropriate particle size cutoff at the appropriate flow rate can be used. An example of a rectangular nozzle virtual impactor is displayed in FIG. 4. The impactor is approximately 10 cm in length, 5 cm in width, and 5 cm in height and is set up the same way as the multi-nozzle impactor. Instead of many nozzles, however, one large slit nozzle approximately 1 mm by 5 cm is used. Since the round nozzle impactor illustrated in FIG. 2 is based on well-established aerodynamic principles, it is the preferred design for the present invention.

Other aerosol generators, such as the Condensation Monodisperse Aerosol Generator (CMAG, Model 3475, TSI Inc.) or similar high-output monodisperse generators could be used in lieu of the aerosol generation subsystem used in the present invention.

One advantage of the present invention is that the virtual impactor 21 allows for the use of an inexpensive nebulizer, which requires compressed air as a carrier gas, as opposed to more expensive nitrogen used in prior art devices.

Another advantage of the present invention is that by using a simple nebulizer 12 along with the APS spectrometer 20, several size-specific FF values can be determined from a single fit test, since the polydisperse challenge allows for multiple size-specific particle count measurements to be taken simultaneously.

Prototype Bio-QNFT System Test Results

A test designed to determine the effect of background particles within the respirator on the measurement of biological FF values was performed on six human subject volunteers. One trial was conducted per test subject. The test consisted of eight representative QNFT exercises; normal breathing (NB), deep breathing (DB), turning head side to side (Head S2S), moving head up and down (Head U&D), bending over (Bend), rotating jaw (Jaw R), speaking (Speak), and mimicking speech (Mimic). A powered air-purifying respirator (PAPR) hood was worn over a negative-pressure, full-facepiece respirator to provide a particle-free atmosphere while the subjects performed the exercises. Since the challenge atmosphere was void of particulates, the background measurements only consisted of particles originating from within the respirator facepiece.

Figure 5:
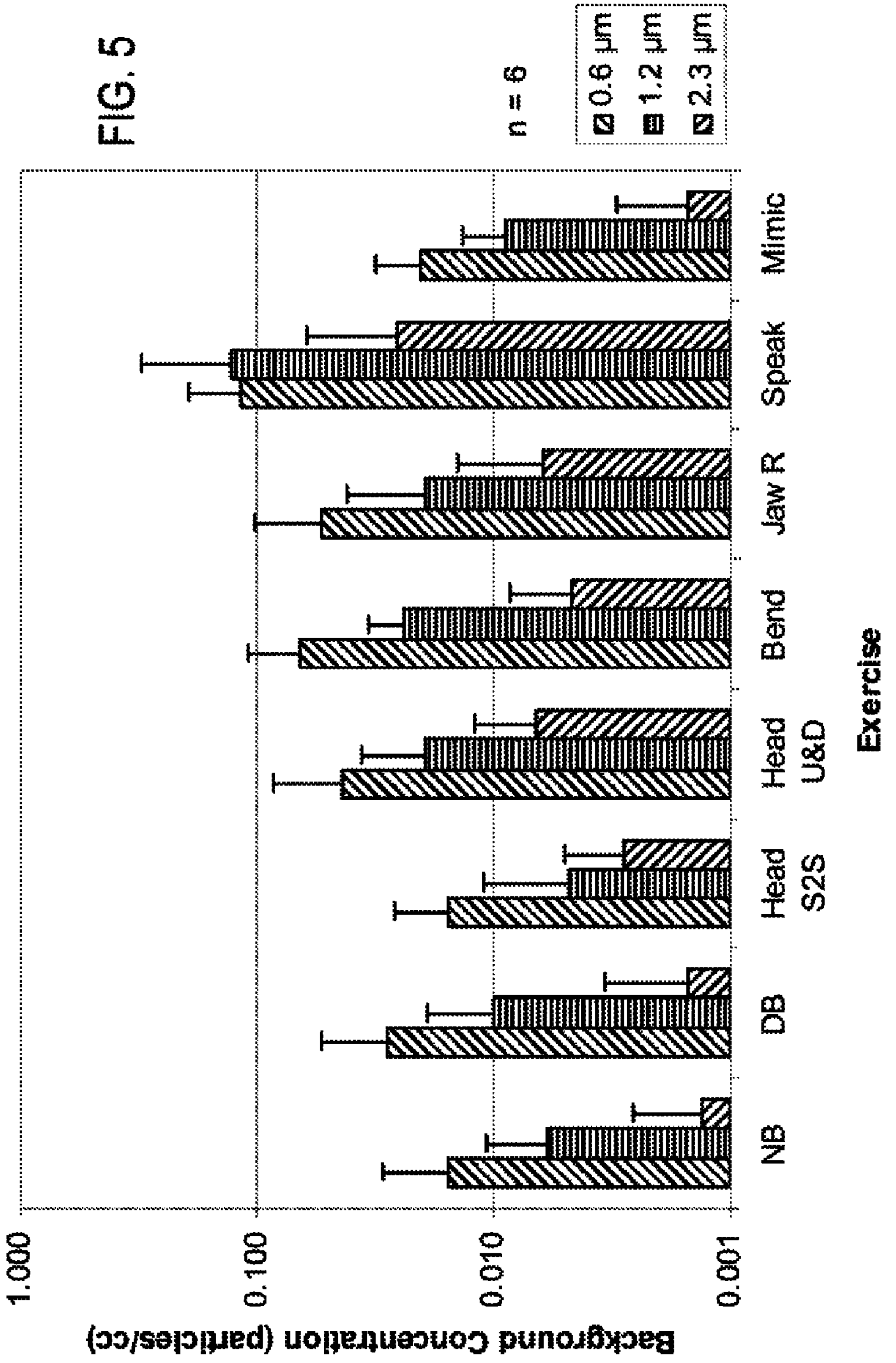
FIG. 5 is a bar graph of the background particulate concentration during fit testing of the respirator with various sizes of challenge particles.

The in-mask background concentration for each exercise is displayed in FIG. 5. The concentration of three background particle sizes (0.6, 1.2, and 2.3 μm) is shown. All exercises created background particles within the respirator at all three sizes measured. The results also indicate that as the particle size increases, the background concentration decreases. Speaking produced the highest concentration of particles for each particle size measured.

Ideally, no background particles would be generated inside the respirator, and the in-mask concentration would only consist of challenge particles. As evidenced in FIG. 5, however, notable levels of background particles are generated inside the respirator mask during fit testing. Since the aerosol spectrometer used in the present invention cannot distinguish between challenge and background particles, the measured in-mask concentration represents the sum of the challenge ($C_i$) and background ($C_b$) particles. Thus, the measurable FF ($FF_{pred}$) can be predicted by Equation 1. The $FF_{pred}$ is determined by dividing the challenge concentration ($C_o$) by the in-mask concentration measurable k con ($C_1+C_b$):

$$FF_{pred} = \frac{(C_o)}{(C_i + C_b)} \tag{1}$$

Equation 1 is used to illustrate the effects of the background particles on the maximum measurable FF during each exercise. Assuming no respirator leakage (i.e., $C_i=0$), the in-mask respirator atmosphere would only contain background particles. Again, since the particle measurement method cannot distinguish between challenge and background particles, the method assumes all particles detected are challenge particles. As a result, the maximum measurable FF ($FF_{max}$) is calculated by dividing the challenge by the in-mask background concentration as shown in Equation 2:

$$FF_{max} = \frac{(C_o)}{(C_b)} \tag{2}$$

An average challenge concentration ($C_o$) of 2,300 particles/cc is used for this analysis. This was the value measured for the 1.2 μm particle size in a QNFT study conducted using a prototype version of the bio-QNFT system shown in FIG. 1. The prototype system was equipped with a 6-jet Collison nebulizer (in lieu of a 24-jet nebulizer) and lacked the virtual impactor. The average $C_o$ value (2,300 particles/cc) is divided by the average 1.2 μm in-mask background concentration ($C_b$) obtained from the background test to estimate the $FF_{max}$ for each exercise. The estimated 1.2 μm log $FF_{max}$ results are shown in Table 1. With the exception of speaking, the log $FF_{max}$ was equal to or greater than 5.0 ($FF_{max} \geqq 100{,}000$) for all exercises. The log $FF_{max}$ for Speaking was only 4.3 ($FF_{max}=20{,}000$).

TABLE 1

1.2 μm Particle Maximum Measurable FF

| Exercise | Max FF (Log) |
|---|---|
| NB | 5.6 |
| DB | 5.4 |
| Head S2S | 5.7 |
| Head U&D | 5.1 |
| Bend | 5.0 |
| Jaw R | 5.1 |
| Speak | 4.3 |
| Mimic | 5.4 |

The addition of a 24-jet nebulizer and virtual impactor as preferred in the present invention will increase the 1.2 μm challenge concentration by approximately a factor of ten. With the higher challenge concentration, the maximum measurable FF will also increase by approximately a factor of ten. Excluding speaking, the maximum measurable FF will increase to above one million for all exercises. Although the maximum estimated FF for speaking will improve to approximately 200,000, the mimicking speech fit test exercise is recommended in lieu of speaking to avoid unduly biasing the FF results.

Eleven test subjects participated in a respirator QNFT study using the prototype bio-QNFT system previously mentioned. Each subject completed several fit tests consisting of five exercises (NB, Head S2S, Head U&D, Bend, and Mimic). Each individual exercise FF was determined by dividing the measured challenge concentration ($C_o$) by the measured in-mask concentration ($C_i$) shown in Equation 3:

$$FF = \frac{(C_o)}{(C_i)} \tag{3}$$

In quantitative fit testing, an overall FF (a harmonic mean) is determined by dividing the number of exercises by the sum of the inverse of the individual exercise FF values. This value is used to determine the adequacy of the fit. For purposes of data analysis, overall FF values were calculated differently for the prototype test results. The overall FF was calculated by log transforming the five individual exercise FF values and averaging the results. Thus, the overall FF values used to assess the prototype system correspond to geometric means.

Figure 6:
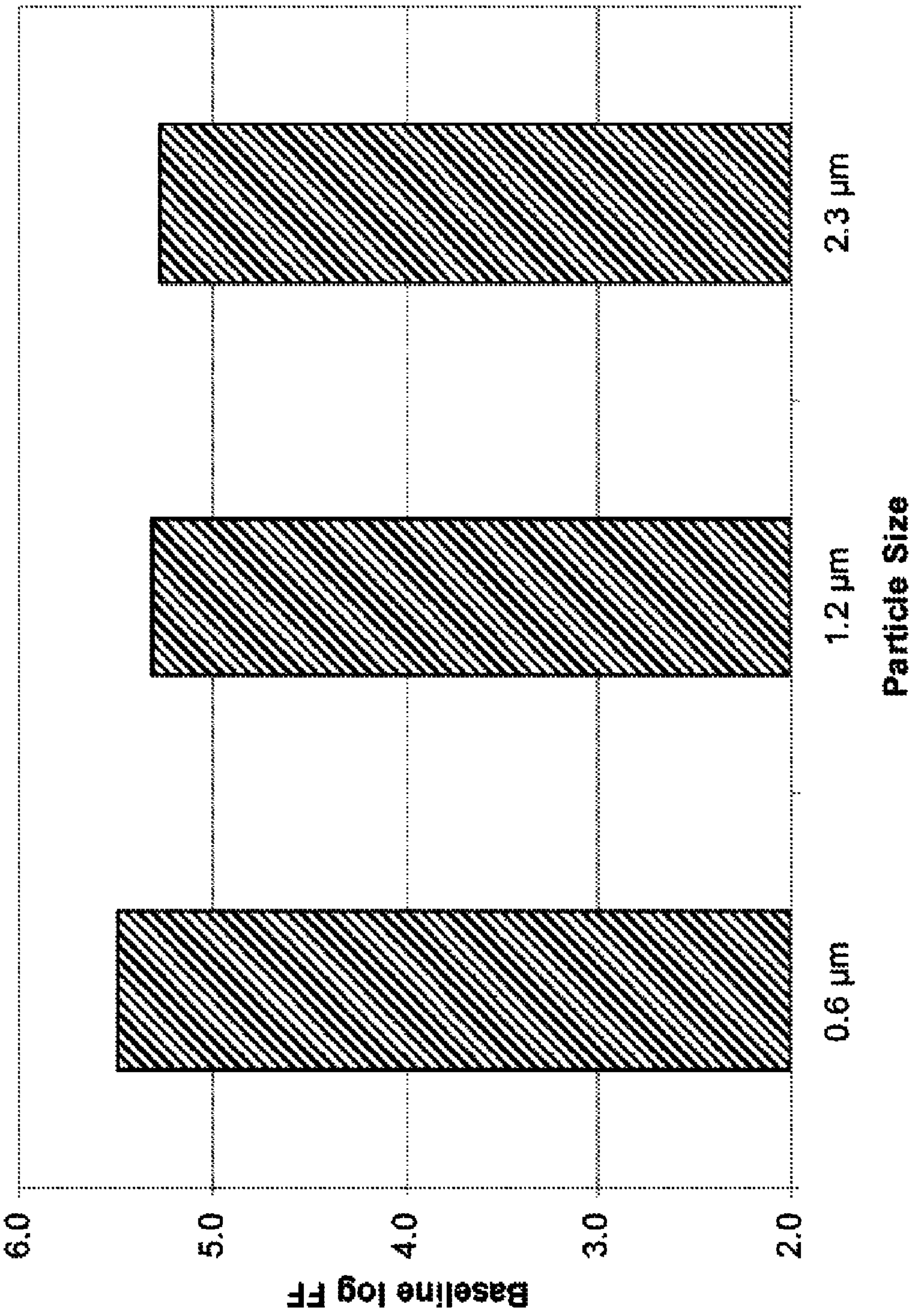
FIG. 6 is a graph of baseline FF results in logarithmic values.

In an effort to determine each subject's best fit (baseline) condition, each subject completed one test condition consisting of a properly sealed respirator. After completion of the baseline condition, the remaining fit test trials were conducted with various levels of respirator seal leakage to obtain a wide range of FF measurements. These leaks were intentionally produced using wires inserted under the sealing surface of the mask or by having the subjects wear an improperly sized and/or fitted respirator. The overall FF values (log transformed geometric means) from the eleven baseline QNFTs were averaged. The 0.6, 1.2, and 2.3 μm FF results are displayed in FIG. 6. The baseline log FF values ranged between 5.0 (FF~100,000) and 5.5 (FF~300,000), which is also similar to the maximum FF values estimated previously. Hence, the bio-QNFT method with a 6-jet nebulizer and no virtual impactor is able to measure FF values slightly greater than 100,000.

Figure 7:
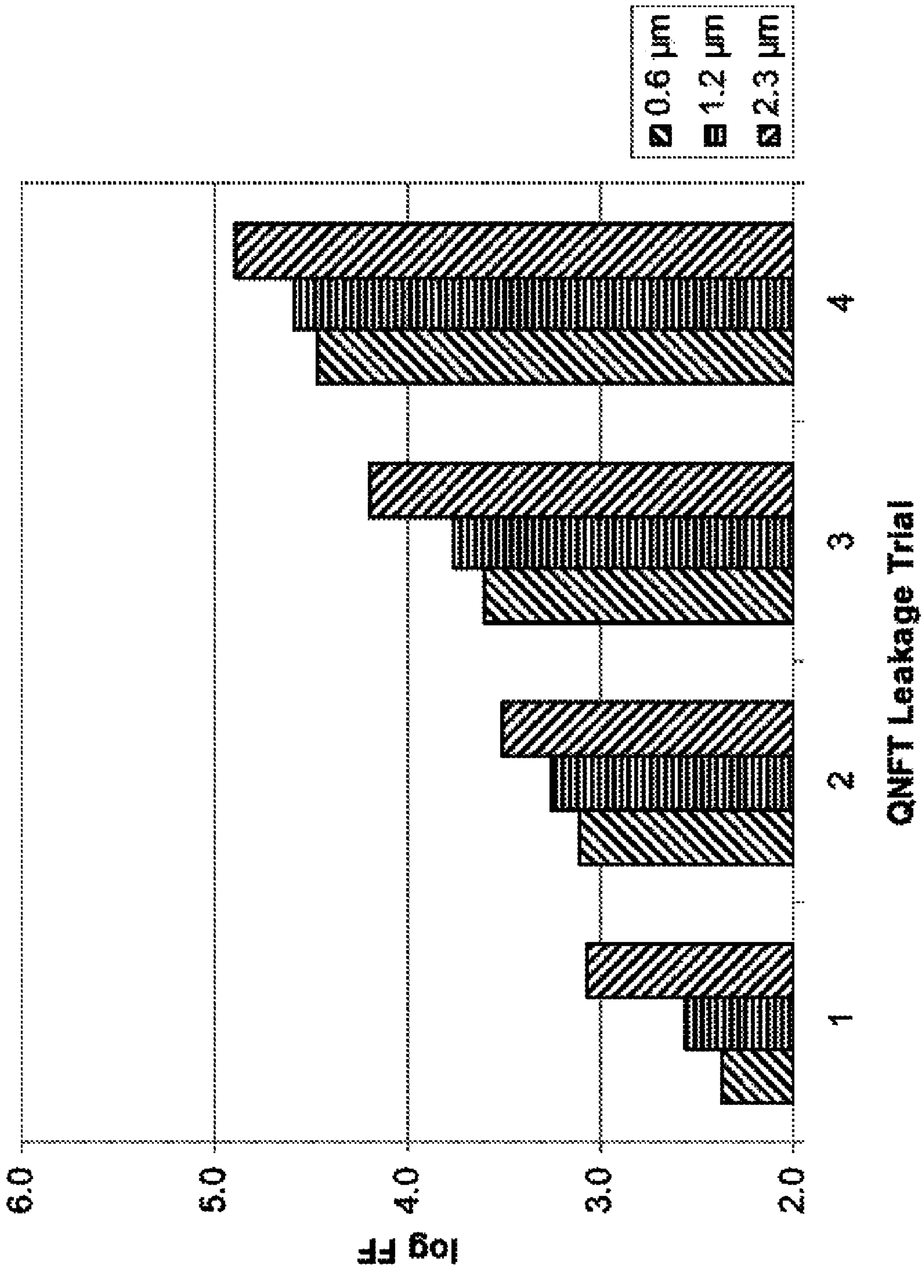
FIG. 7 is a graph of the QNFT Subject FF Results.
Figure 8:
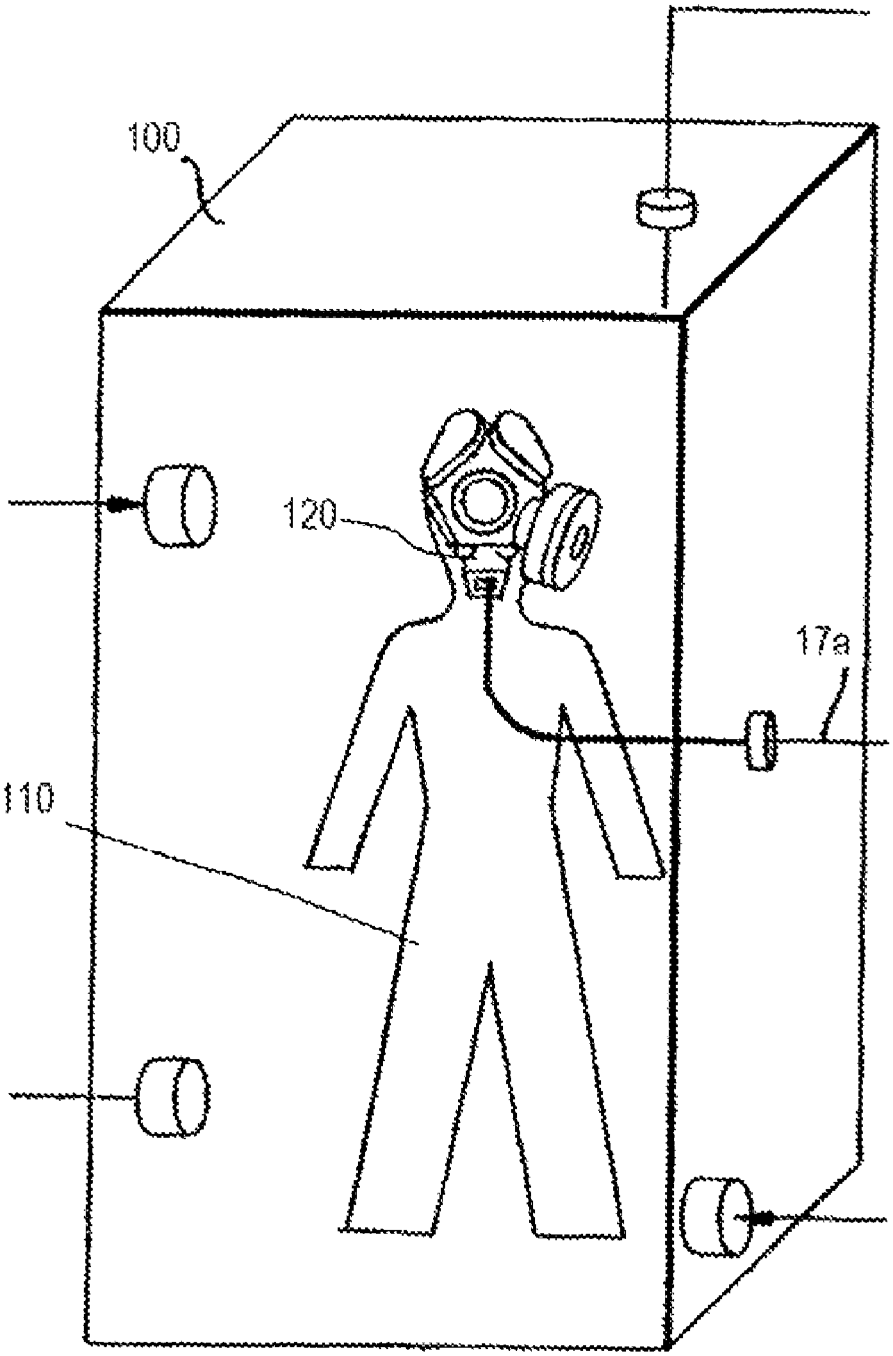
PRIOR ART FIG. 8
FIG. 8 is a standard exposure chamber according to the prior art.

To illustrate the importance of the size-specific FF measurement capability of the bio-QNFT system, four arbitrary "leakage" fit tests with log FF values below 5.0 are plotted in FIG. 7. These results were obtained from the artificially induced leakage fit test trials previously mentioned. Within all four data sets, differences can be seen between the size-specific FF values. The FF values tend to increase as the particle size increases. This trend was seen in most of the QNFT data with log FF values below 5.0. Since the FF is a function of particle size and different bio-aerosol threats have different characteristic size distributions, a size-specific measurement capability for determining biological FFs as demonstrated by the present invention is clearly advantageous. These results demonstrate that the bio-QNFT method can be customized to obtain FF values for specific bio-aerosol threats.

The prototype bio-QNFT system demonstrated above was able to measure FF values in excess of 100,000. The inclusion of a larger nebulizer (e.g., a 24-jet nebulizer) and virtual impactor as preferred in the present invention will increase the challenge concentration by at least an order of magnitude. Thus, the sensitivity of the bio-QNFT system will be increased an order of magnitude enabling size-specific FF values of 1,000,000 or greater to be measured without the need for correcting for in-mask background particles generated by the mask wearer performing the fit test exercises.

It is to be understood that various substitutions of the items illustrated herein may be made by a person of ordinary skill in the art. However, it is also appreciated that such substitutions fall within the spirit of the invention and the scope of the appended claims.

In addition, the bio-QNFT method could also be used as a Total Inward Leakage (TIL) test method to qualify or certify respirator protective performance under a national test standard (42 CFR Part 84), as opposed to just an OSHA-regulated workplace QNFT test (29 CFR Part 1910) that assesses the goodness of fit. In the former case (TIL), the entire respirator system is assessed (mask seal and all components such as outlet valve and filter) on a defined sample population of mask wearers (test subjects). In the later case (QNFT), the fit of a particular type of respirator to the specific individual is assessed to ensure the proper mask size is selected. The claimed invention is suitable for use with many types of test standards, not just those listed herein above.

What is claimed is:

1. A method of fit testing a respirator using a biological quantitative fit test (bio-QNFT) system, said method comprising the steps of:

(a) providing a bio-QNFT system comprising: an exposure chamber for receiving and retaining a challenge atmosphere, said challenge atmosphere comprising a concentration of an aerosol comprising particles output from an aerosol generation device, wherein said aerosol generation device aerosolizes an inert oil for producing the challenge atmosphere comprising a concentration of an aerosol comprising particles having a size range equivalent to hazardous airborne biological agents, and wherein said aerosol generation device includes a virtual impactor having a major air stream and a minor air stream for separating particles according to a desired size range comparable to a size range of hazardous airborne biological agents, wherein the minor air stream has a slower moving airflow than the major air stream, and wherein the virtual impactor separates relatively larger particles from a remainder of particles, and the relatively larger particles are concentrated into the minor air stream and forced into said exposure chamber so that particles entering the chamber have a size range equivalent to hazardous airborne biological agents while the major air stream is discarded and does not enter the chamber, said exposure chamber to permit fit testing of said mask or respirator system; and at least one aerosol sampling subsystem for measuring a concentration and/or quantity and size of particles of a sample of the challenge atmosphere retained within said exposure chamber, and a concentration and/or quantity and size of particles of a sample from within said mask or respirator system when configured for use, said aerosol sampling subsystem including an aerosol spectrometer for counting particles according to size so that particles comparable in size to hazardous airborne biological agents are accurately counted within said sample of said exposure chamber and from within said sample from said mask or respirator system according to a predetermined number of categories over a size range comparable to airborne biological agents;

(b) configuring said respirator system for use in said exposure chamber;

(c) providing the exposure chamber with the challenge atmosphere mainly of particles of a desired size range that were separated by the virtual impactor; and (d) measuring the concentration and/or quantity and size of challenge particles from within the respirator system after one or more physical stresses are placed on at least one portion of the respirator system.

2. The method according to claim 1, wherein the physical stresses placed on the respirator include a subject wearing a respirator on one's face and performing at least one of the following:

(i) normal breathing;

(ii) deep breathing;

(iii) turning head from side to side;

(iv) moving head up and down;

(v) bending over;

(vi) rotating jaw; and (vii) mimicking speech.

3. The method according to claim 2, wherein at least one action in sub-steps (i) through (vii) are performed with challenge particles in the challenge atmosphere ranging in size from about 1 μm to about 5 μm.

4. The method according to claim 1, wherein the particles provided in the challenge atmosphere correspond in size to a range of sizes for bio-hazardous agents.

5. The method according to claim 4, wherein the size of the particles range from about 0.6 μm to about 5 μm.

6. The method according to claim 4, wherein the concentration and/or number and size of the challenge particles and particles sampled from inside the respirator are measured with the spectrometer.

* * * * *